July 21, 1959 J. HIMKA ET AL 2,895,764
VEHICLE FOLDING TOP
Filed March 9, 1955 8 Sheets-Sheet 2
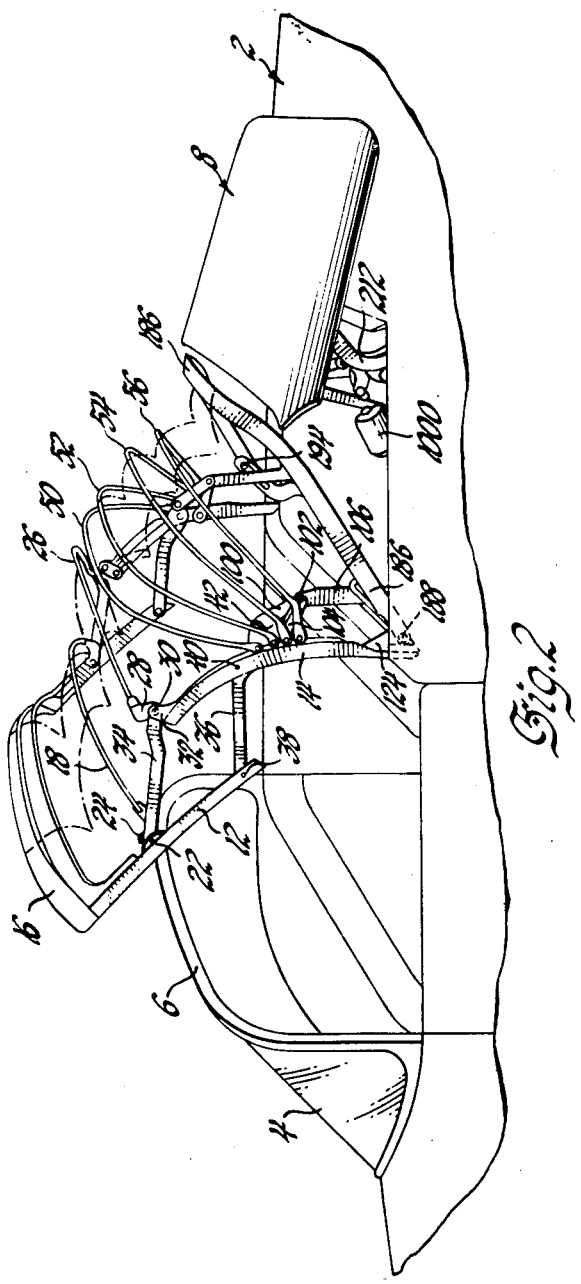
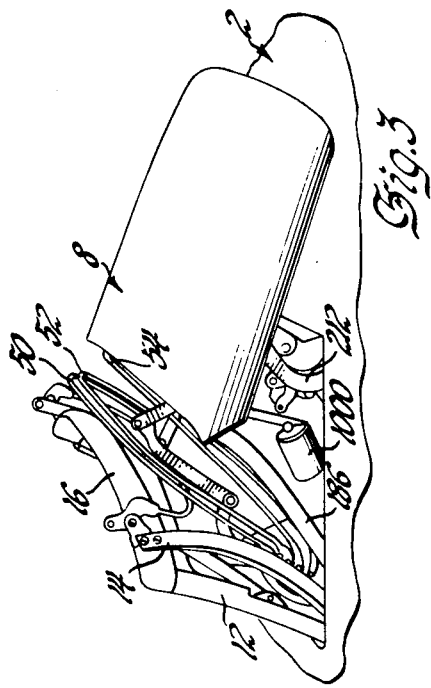
INVENTORS
*Frederick C. Walther &
John Himka*
BY *Paul Fitzpatrick*
ATTORNEY

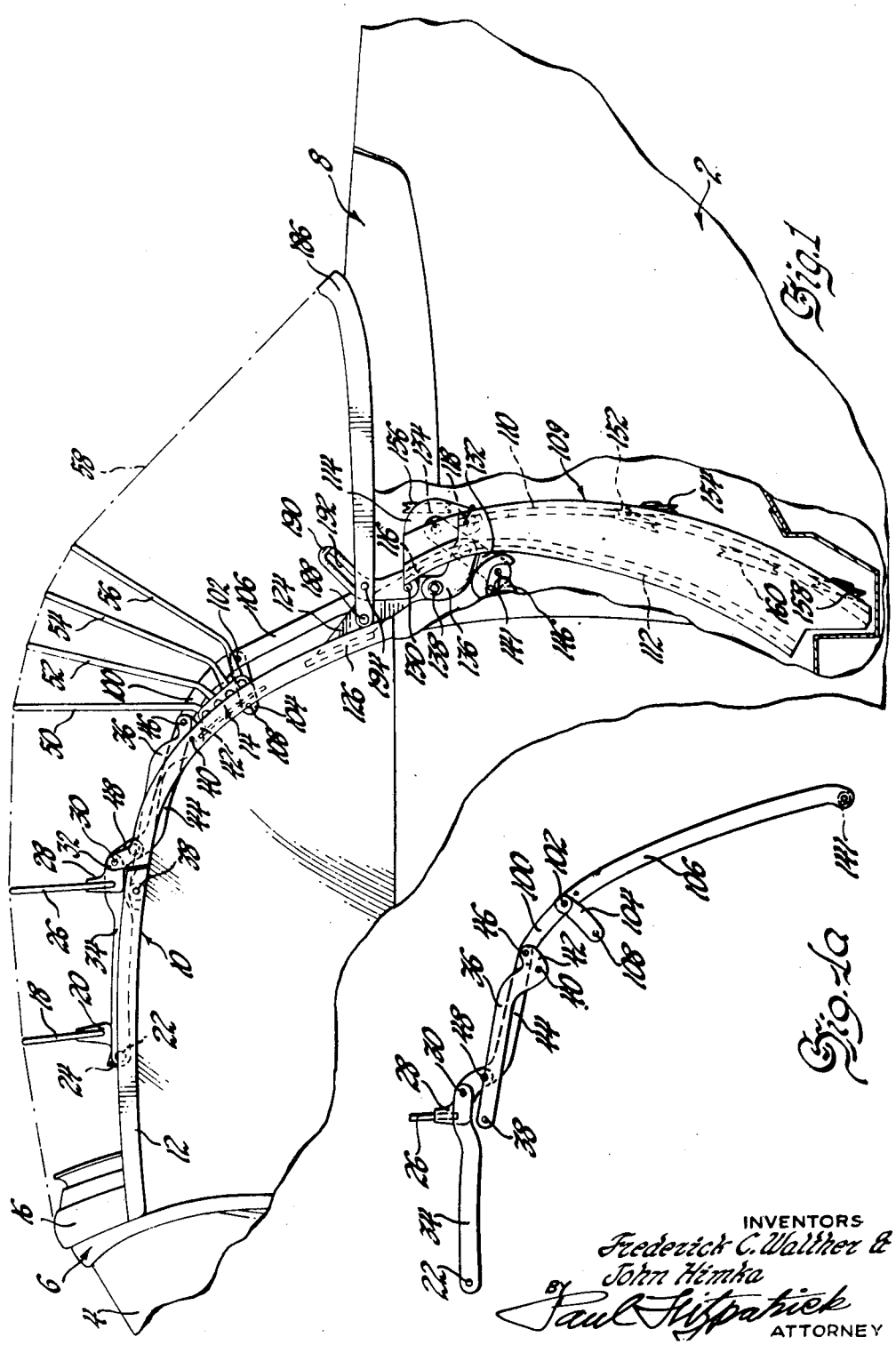

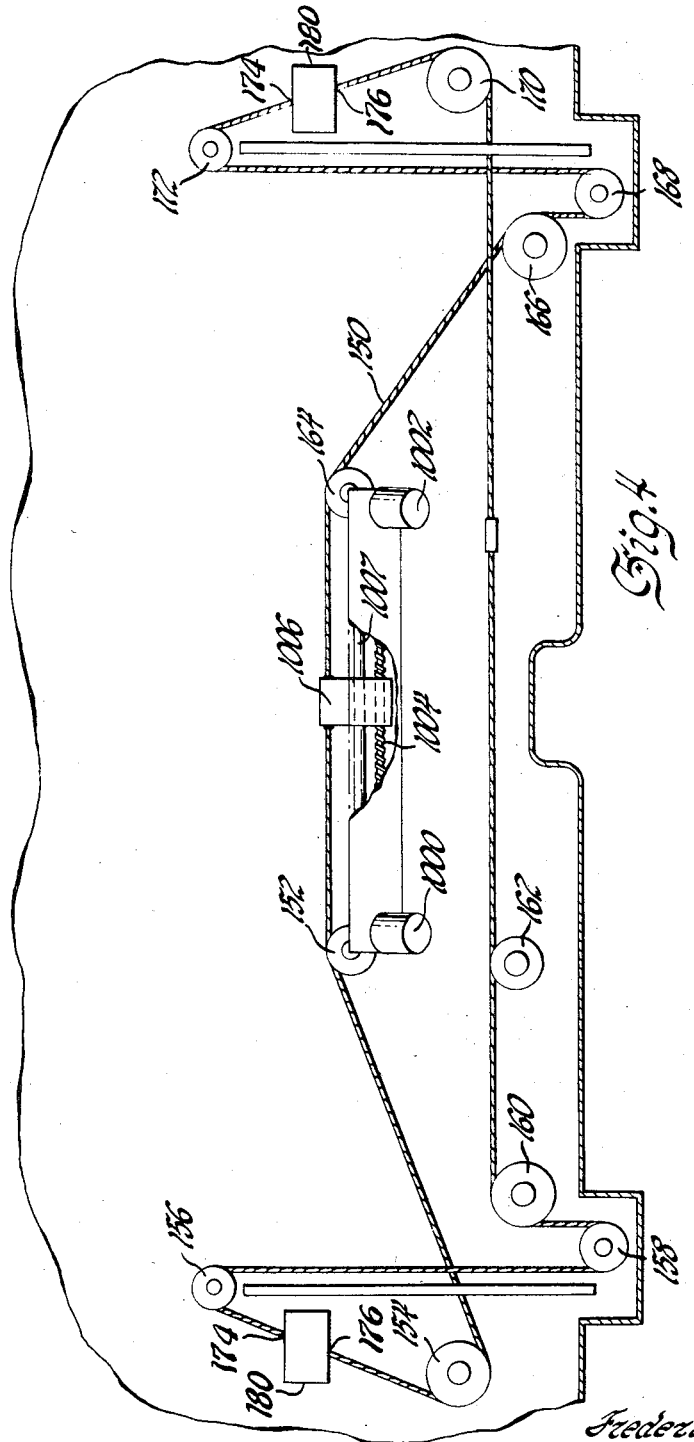

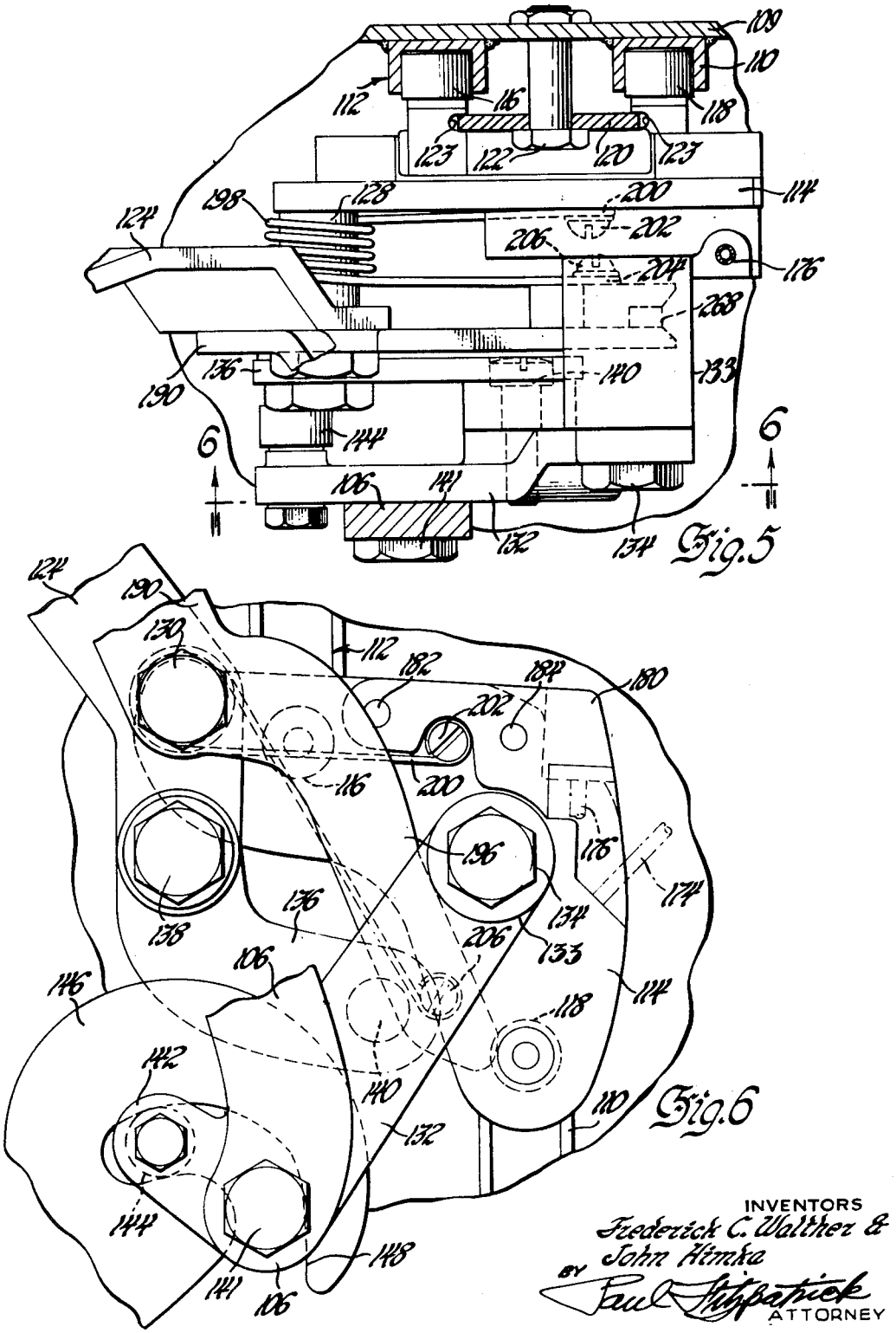

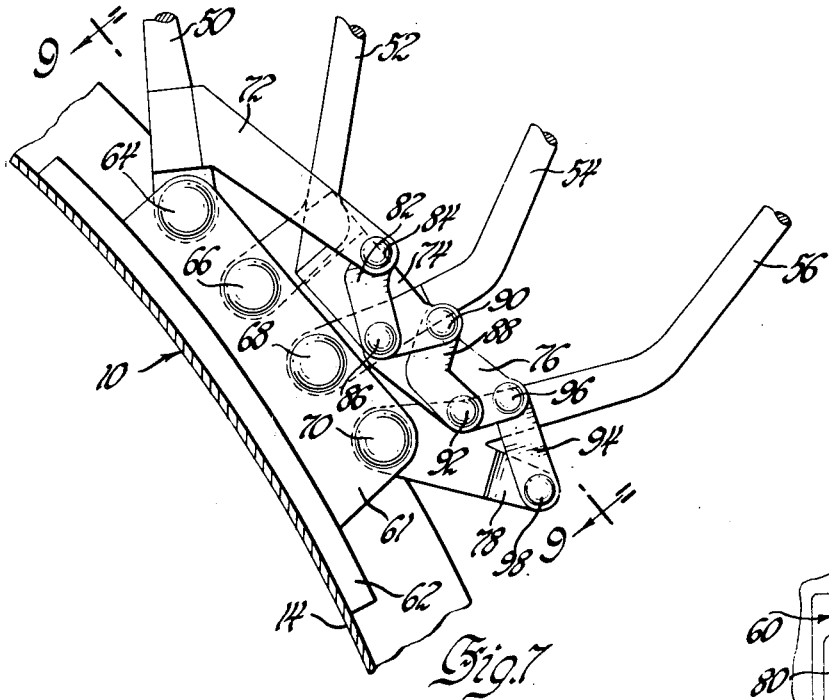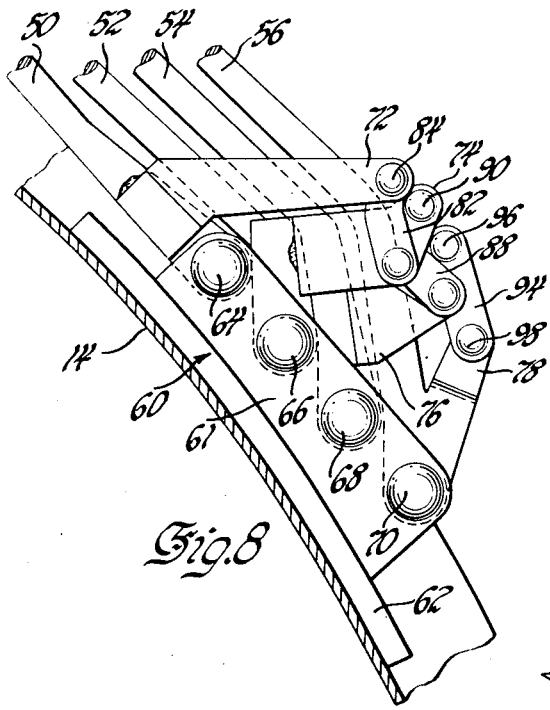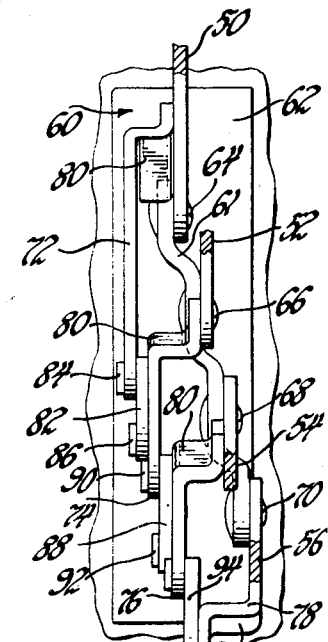

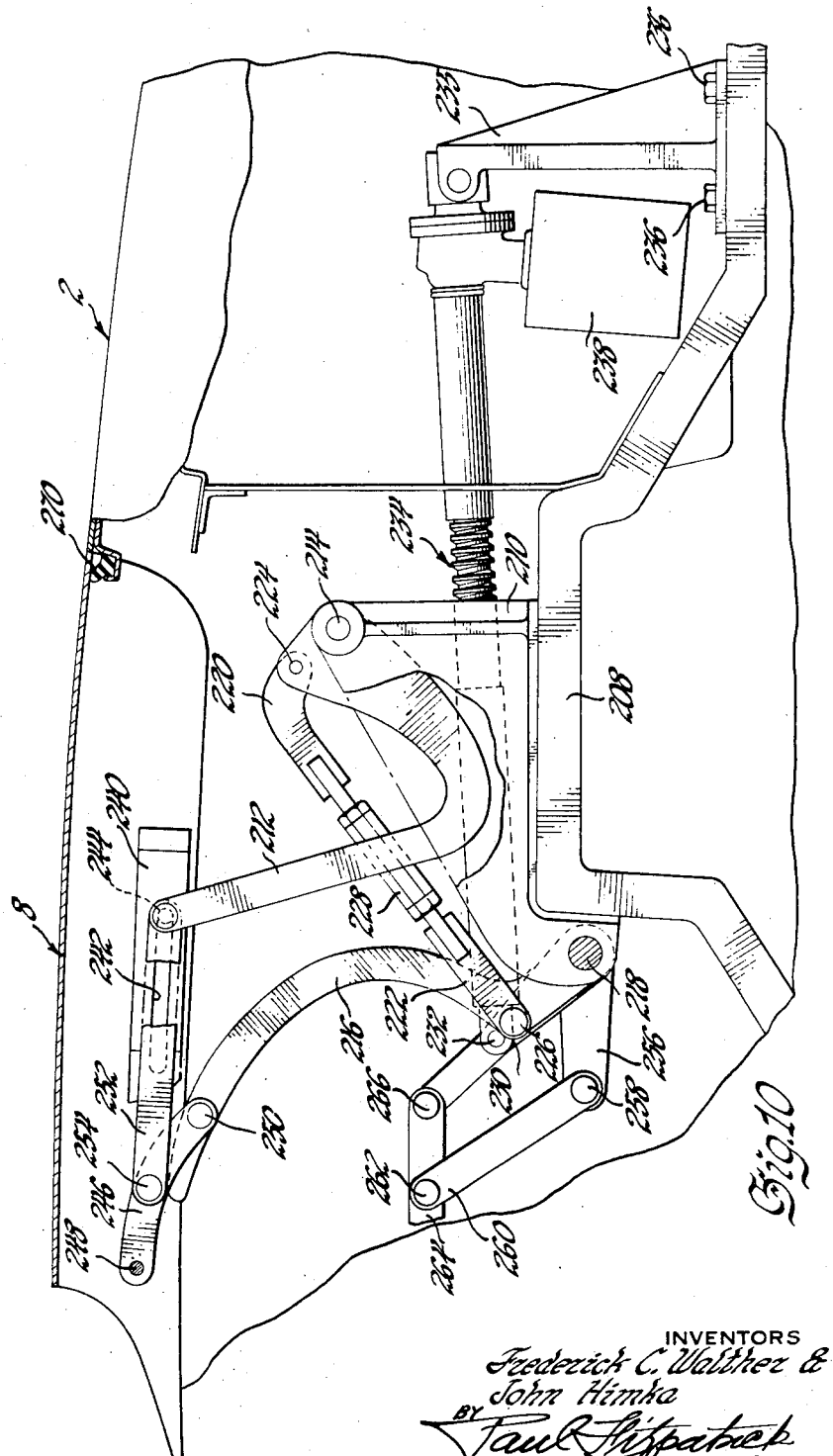

July 21, 1959
J. HIMKA ET AL
2,895,764
VEHICLE FOLDING TOP
Filed March 9, 1955
8 Sheets-Sheet 8
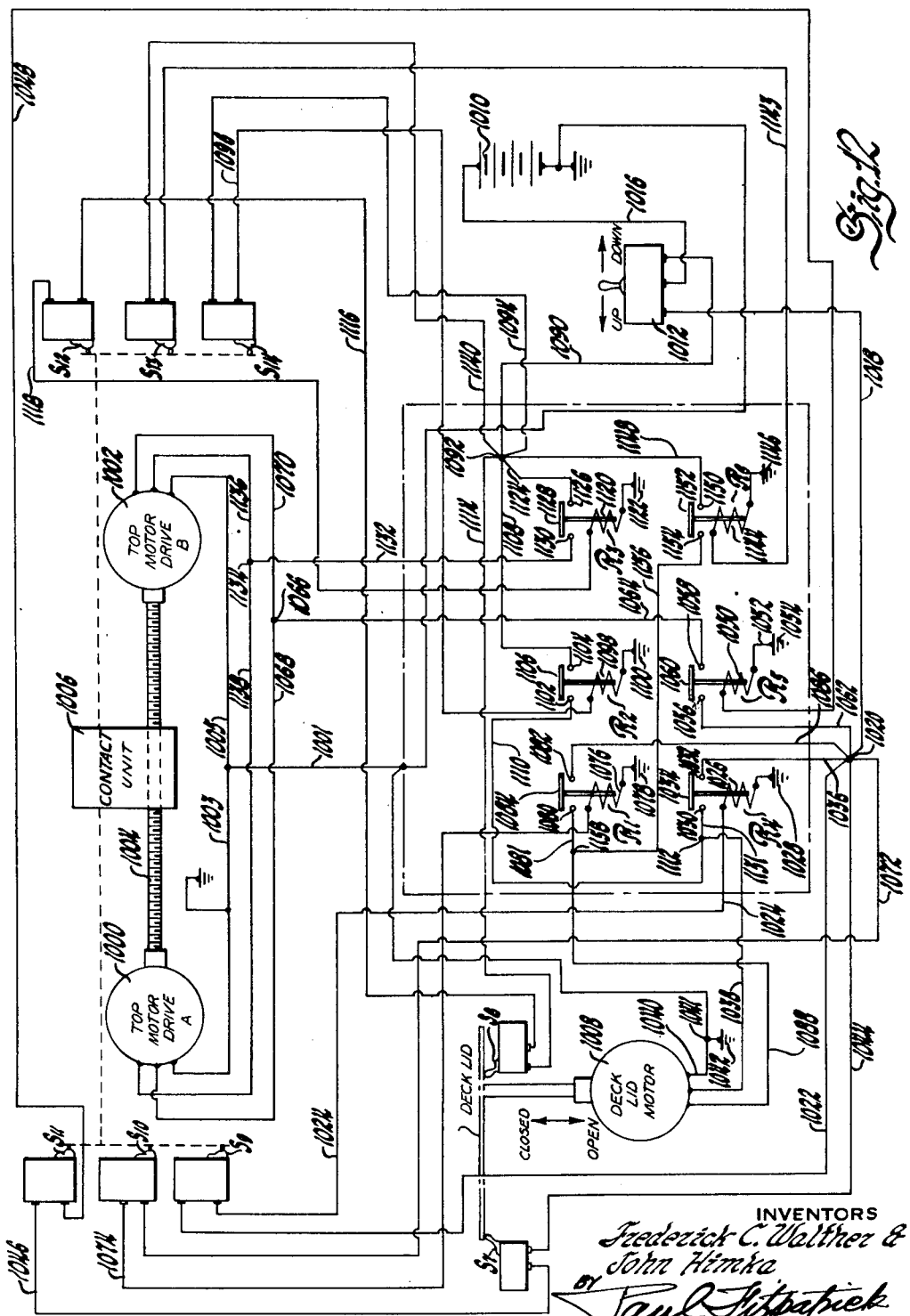
INVENTORS
Frederick C. Walther &
John Himka
Paul Fitzpatrick
ATTORNEY

United States Patent Office 2,895,764
Patented July 21, 1959

2,895,764

VEHICLE FOLDING TOP

John Himka, Detroit, and Frederick C. Walther, Grosse Pointe, Mich., assignors to General Motors Corporation, Detroit, Mich., a corporation of Delaware Application March 9, 1955, Serial No. 493,261

8 Claims. (Cl. 296—117)

This invention relates to a vehicle folding top and more particularly to the operating and control mechanism for such a top. This application is a continuation-in-part of our application Serial No. 404,485, filed January 18, 1954, now abandoned.

In many modern convertible type vehicles, the top structures are raised and lowered by hydraulic or electric power actuators. The use of these power actuators presents certain disadvantages, one of the principal disadvantages being the amount of space required to fit the actuator within the body. The top structures also require storage space within the body, and the space required is often excessive because of the manner in which the folded top is stored within the vehicle body. The folded top structure of this invention and the power actuator for raising and lowering the top are located within the vehicle body in such a manner that only a limited amount of space is required.

One particular feature of this top structure is that the top is retracted into and projected out of the vehicle body in a vertical folded position, rather than the top being stored in a horizontal position. By storing the top thus, space is available for the power actuator and also for any vehicle accessories mounted within the rear of the body. Another principal feature of this top is in the operating mechanism which moves the top into and out of the body in a vertical folded position and folds and unfolds the top. A further feature of this invention lies in the top compartment lid which conceals the folded top from view when stored within the body, and which is electrically and mechanically coordinated with the top structure.

The primary object of this invention is to provide an improved convertible top and operating mechanism therefor to fold and unfold the top and also move the folded top into and out of the body in a vertical position.

This and other objects of this invention will be readily apparent from the following specification and drawings, in which:

Figure 1 is an elevational view of a top according to this invention in raised position;

Figure 1a is a partial elevation view of the linkage arrangement of such a top;

Figure 2 is a perspective view of the top of Figure 1 in partially folded position;

Figure 3 is a perspective view of the top of Figure 1 as it is retracted into the vehicle body;

Figure 4 is a simplified schematic diagram of the cable drive system for the top;

Figure 5 is a plan view of part of the operating mechanism;

Figure 6 is an elevational view of part of the operating mechanism on the plane indicated by line 6—6 of Figure 5;

Figure 7 is a view of certain of the top bows in raised position;

Figure 8 is a view of the bows of Figure 7 in folded position;

Figure 9 is a sectional view on the plane indicated by line 9—9 of Figure 7;

Figure 10 is a sectional view of the deck lid and its operating mechanism in closed position;

Figure 12 is a diagram of the electrical circuit for the top.

Figure 11:
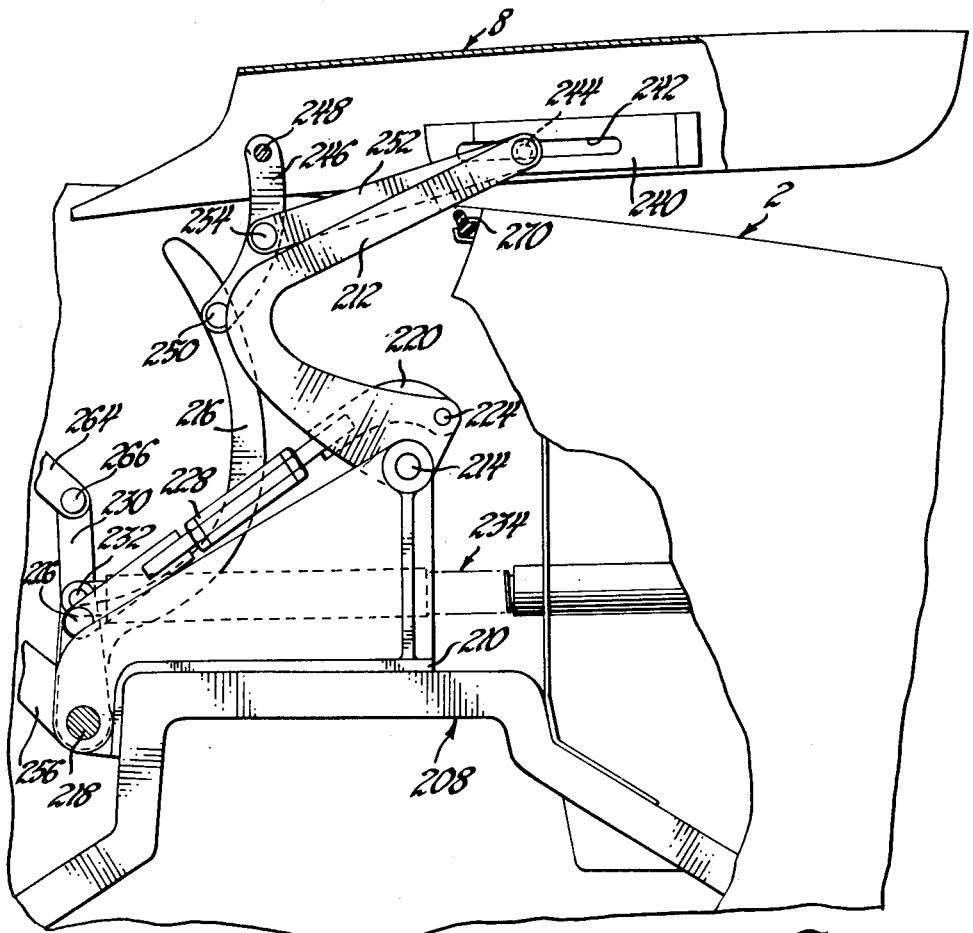
Figure 11 is a similar view of the deck lid and its operating mechanism in open position.

Since the top structure of this invention is the same at either side of the vehicle, only one side will be described. Referring now to Figures 1, 1a, 2, and 3, a convertible type vehicle 2 includes a windshield 4, a windshield header 6, and a top cover 8 which is movable between open and closed positions and conceals the top when it is stowed. The top frame includes a pair of spaced foldable side rails 10, each of the side rails including a front rail section 12 and a rear rail section 14. A front header 16 fixed on the front rail sections 12 engages the windshield header 6 in the raised position of the top. Suitable latches (not shown) may be provided to secure the header in place after the top has been raised.

A front bow 18 includes an arm extension 20 pivotally mounted on the front rail section 12 at 22. The arm extension 20 includes a flanged edge 24 which controls the folding movement of the bow as will be hereinafter described. An intermediate bow 26 includes an angular arm extension 28 pivotally mounted at 30 on an upstanding lug 32 fixed to the rear rail section 14. A link 34 is pivotally connected to the front rail section at 22 and to the upstanding lug 32 at 30. Another link 36 is pivoted on the front rail section at 38 and on the rear rail section at 40. Links 34 and 36 form a parallel linkage arrangement and control the folding movement of the front rail section so that this section folds under the rear rail section as the rear rail section assumes its vertical position, as can be seen from a comparison of Figures 1, 2, and 3. As the front rail section folds under the rear rail section, link 34 engages the flanged edge 24 of arm extension 20 to fold the front bow forwardly of the vehicle.

The folding and unfolding movement of the intermediate bow 26 is controlled by the top as the top is raised and lowered. The link 36 includes an arm extension 42, and a link 44 is pivoted to this arm extension at 46 and to the arm extension 28 of bow 26 at 48. As the top is folded, link 36 is moved counterclockwise about its pivot 40 to fold the front rail section under the rear rail section. This movement of link 36 shifts link 44 forwardly so that the intermediate bow 26 is folded rearwardly, as can be seen in Figure 2. When the top is raised, link 36 swings counterclockwise about pivot 40 to shift link 44 rearwardly and unfold bow 26.

The top also includes a group of coordinated rear bows 50, 52, 54, and 56. The folding movement of these bows is controlled by the top and the unfolding movement of the bows is controlled by fabric travel of the top fabric 58.

Referring now to Figures 7, 8, and 9, a bracket 60 includes a stepped flange 61 and a base 62 which is welded to the rear rail section 14. The rear bows 50, 52, 54, and 56 are pivotally mounted in the flange 61 at 64, 66, 68, and 70, respectively. Each of the bows includes a laterally extending arm 72, 74, 76, and 78, respectively. As can be seen in Figure 9, arms 72, 74, and 76 include an offset flanged end 80 which is welded to the bows adjacent the pivotal connections of the bows on flange 61. Arm 78 is formed integral with bow 56 and has an offset 81. A link 82 pivotally interconnects arms 72 and 74 and 84 and 86, respectively. A similar link 88 pivotally interconnects arms 74 and 76 at 90 and 92, respectively, and a link 94 pivotally interconnects arms 76 and 78 at 96 and 98, respectively. It can be seen that the bows, arms and links are in stepped arrangement in both the folded and unfolded positions of the bows. This allows the bows to be easily folded into a compact group without interference between the arms and the links.

Referring now to Figures 1, 1a, and 2, the controlling mechanism for the folding movement of the bows will be described. A link 100 is pivotally connected to links 36 and 44 at 46, and the other end of the link is pivoted at 102 to link 104 and power arm 106. The other end of link 104 is pivoted on the rear rail section 14 at 108. The pivotal connection 102 between power arm 106 and links 100 and 104 is an outwardly extending stud. In the raised position of the top as shown in Figure 1, this stud is below the coordinated bows 50, 52, 54, and 56. As the top is being lowered, the power arm 106 is shifted upwardly, as will be hereinafter described, and the stud 102 is swung in an arc about pivot 108 by link 104 to engage the rearmost bow 56, as can be seen in Figure 2, and fold the bows forwardly as the top is folded. Since the bows are interconnected by the arms and the links for coordinated folding movement, the action of stud 102 on the rearmost bow 56 moves all the bows from their unfolded position of Figure 7 to their folded position of Figure 8.

Power arm 106 also controls the folding and unfolding movement of the front rail section relative to the rear rail section. When the top is folded, the upward shifting movement of power arm 106 swings link 104 counterclockwise about pivot 108 and causes link 100 to swing link 36 counterclockwise about pivot 40 to fold the front rail section under the rear rail section as the rear rail section moves to its vertical position of Figure 2. When the top is unfolded after being withdrawn from the body in a vertical folded position, power arm 106 is shifted downwardly, as will be hereinafter described, to swing link 104 clockwise about pivot 108 and cause link 100 to swing link 36 clockwise about pivot 40 and move the front rail section forwardly and outwardly from under the rear rail section as the rear rail section is moved from its vertical position of Figure 2 to its position of Figure 1.

Referring now to Figures 1, 5, and 6, the operating mechanism of the top will be described. This operating mechanism controls the folding and unfolding movement of the top and also moves the top into and out of the well in its vertical folded position. Plates 109 are secured to the outer body panel on either side of the vehicle. These plates mount a pair of spaced arcuate tracks 110 and 112. As can be seen in Figure 1, the tracks diverge at their lower portion for a purpose which will be hereinafter described. A top support plate 114 is slidably mounted on tracks 110 and 112 by two rollers 116 and 118 on the plate. A plate 120 bolted to plate 109 at 122 fits within the notches 123 in the shafts of the rollers to insure that the rollers will not be pulled out of the tracks. As can be seen in Figure 6, roller 116 is mounted on plate 114 above roller 118. Referring now to Figure 1, as the support plate 114 moves within the well, the divergence of the arcuate tracks 110 and 112 at their lower portion causes the lower portion of the folded top to be shifted forwardly as the top is retracted so that the top will fit within a more limited space than if the top were merely retracted into the well in a straight vertical movement.

A depending power arm 124 is fixed to the rear rail section 14 at 126 and pivotally mounted on a circular boss 128 of plate 114 at 130 adjacent the lower end of the arm. An arm 132 is pivoted on a circular boss 133 of plate 114 by bolt 134 and interconnected with power arm 124 by a link 136 pivoted to the power arm at 138 and to arm 132 by bolt 140. The lower end of the other power arm 106 is pivoted on arm 132 by bolt 141. Arm 132 includes an offset portion 142 which supports a cam follower 144. The cam follower is engageable and disengageable with a stationary cam 146 having a cam slot 148. The stationary cam is secured to the vehicle body as can be seen in Figure 1.

The support plate 114 supports the entire top and is moved along tracks 110 and 112 by a cable and pulley system shown schematically in Figure 4. Referring now to Figure 4, two electric motors 1000 and 1002 are arranged to apply their combined torque to a lead screw 1004 which drives a contact unit 1006. The contact unit is guided by a rod 1007. When the top is raised, the contact unit 1006 moves from left to right along the shaft 1004 and, when the top is lowered, the contact unit moves in the opposite direction. Power is transmitted from the contact unit to the support plates 114 by a cable 150 and a number of pulleys 152, 154, 156, 158, 160, 162, 164, 166, 168, 170, and 172. These pulleys are supported on the vehicle body, some of the pulleys being shown in Figure 1. The cable is broken between pulleys 154 and 156 and 170 and 172, with the ends 174 and 176 of the cable being secured to a plate 180 fixed to plate 114 at 182 and 184. Thus, as the contact unit moves along shaft 1004 the power transmitted by the cable and pulley system moves the plates 114 upwardly and downwardly along the tracks to operate the top.

Referring now to Figures 1, 5, and 6, the folding and unfolding movement of the top will be described. When the top is lowered, the support plate 114 is moved downwardly along the tracks by the cable and pulley system. As the plate moves along the tracks, arm 132 swings clockwise about its pivot 134 on the base plate as the cam follower 114 moves further into the slot 148 in cam 146. This movement of arm 132 moves the power arm 106 upwardly to fold the front rail section of the top frame under the rear rail section of the top frame as already described, and also to fold the front and intermediate bows 18 and 26 and the group of coordinated rear bows 50, 52, 54, and 56. Power arm 124 is moved clockwise about its pivot 130 by link 136 to raise the rear rail section to a vertical position as shown in Figure 2 as the front rail section is moved under the rear rail section to fold the top. As plate 114 continues to move downwardly along the tracks, the cam follower 144 is slowly withdrawn from the cam slot 148 as arm 132 passes through its horizontal position and moves to a terminal position slightly above the horizontal position. The cam follower and the arm remain in this position as the support plate continues to move downwardly along the tracks and the folded top is retracted within the vehicle body, with the lower portion of the folded top shifting forwardly as previously described by the divergence of tracks 110 and 112.

When the top is raised, the support plate is moved upwardly along the tracks by the cable and pulley system and the cam follower 144 again engages cam slot 148 to move arm 132 counterclockwise about its pivot 134 on the support plate. This causes power arm 106 to be shifted downwardly to unfold the front rail section and power arm 124 to be moved counterclockwise about its pivot 130 to lower the rear rail section from its vertical position to its position shown in Figure 1 as the front rail section moves to its unfolded position. Thus, power arms 106 and 124 control the folding and unfolding movement of the top, the action of power arm 124 being transmitted directly to the rear rail section and the action of power arm 106 being transmitted to the front rail section to fold and unfold the front rail section as the rear rail section is moved between its position of Figure 1 and its vertical position of Figure 2 prior to the top being retracted into the vehicle body or subsequent to the top being extended from the body.

Referring now to Figures 1, 2, 5, and 6, the top also includes a rear bow 186 which is pivotally mounted on power arm 124 at 188. The movement of this bow is coordinated with the movement of the top well lid 8 so that the bow rests on top of the lid in the raised position of the top as shown in Figure 1 and moves upwardly to its position of Figure 2 to allow the lid to be moved to its open position of Figure 2 prior to the folding of the top and its retraction into the body. An arm 190 pivotally mounted on the support plate 114 at 130 defines a slot 192 cooperating with a pin 194 fixed to bow 186 and a downwardly extending arcuate arm portion 196. Arm 190 is mounted on boss 128 coaxially with power arm 124, but each arm is freely rotatable with respect to the other arm. A coil spring 198 fits around boss 128 and has one end 200 secured to plate 114 at 202 and the other end 204 secured to arm portion 106 at 206. The coil spring continually biases arm 190 counterclockwise about pivot 130 so that the rear bow 186 would be held in its position of Figure 2 if no mechanism were provided to counteract the action of the spring and lower the bow to its position of Figure 1 where it rests on the deck lid. The entire movement of the rear bow 186 is controlled by the pin and slot connection between the bow and arm 190. The mechanism which lowers the bow from its position of Figure 2 to its position of Figure 1 when the top is in fully raised position is part of the operating mechanism for the deck lid.

Referring now to Figures 10 and 11, a pair of spaced supports 208 are secured to the lower body panel of the vehicle. A pair of brackets 210 fixed to supports 208 support the controlling linkage for the deck lid. This linkage includes a gooseneck arm 212 pivotally mounted on bracket 210 at 214 and another curved arm 216 fixed to shaft 218 which is rotatably mounted within the bracket. Fittings 220 and 222 are pivoted on arms 212 and 216 at 224 and 226, respectively, and an adjustable turnbuckle 228 interconnects the fittings so that any movement of one arm is transmitted to the other arm. An arm 230 which is fixed on shaft 218 inboard of arm 216 is pivotally connected at 232 to screwjack 234. The screwjack assembly includes a supporting bracket 235 bolted to support 208 at 236 and an electric motor 238. An offset bracket 240 having a slot 242 is welded to either side of the lid 8. The upper end of arm 212 mounts a stud 244 which is slidably mounted in slot 242. An arm 246 pivoted to the deck lid at 248 and to arm 216 at 250 is interconnected with arm 212 by link 252 pivoted to the arm at 254 and to arm 212 by stud 244.

To move the deck lid from its closed position shown in Figure 10 to its open position shown in Figure 11, the screwjack is operated to swing arm 230 rearwardly and rotate shaft 218 clockwise. As the shaft moves in this direction, arm 216 swings in a clockwise direction, and power is transmitted from arm 216 to arm 212 to swing the latter arm in the same direction by the links 220 and 222 and the adjustable turnbuckle 228. As arm 212 swing in this direction, stud 244 is moved forwardly within slot 242 by the action of arm 246 so that the rear portion of the deck lid is initially moved upwardly and then the deck lid is moved rearwardly to its final open position as shown in Figure 11.

As previously stated, the rear top well lid operating mechanism controls the movement of the rear bow 186 from its position of Figure 2 to its position of Figure 1. An arm 256 fixed to shaft 218 is connected at 258 to a link 260. Link 260 is pivoted at 262 to a shiftable link 264 which is pivoted at 266 to arm 230. When the top is in raised position and the lid is in closed position, the shiftable link 264 bears against the grooved end 268 (Figure 5) of arm portion 196 of arm 190 to bias the arm clockwise about its pivot 130 so that the camming action of pin 194 in slot 192 will move bow 186 downwardly until it rests on the rear deck lid as shown in Figure 1. When it is desired to lower the top, the lid is initially moved from its position of Figures 1 and 10 to its position of Figures 2 and 11. As the lid moves to the latter position, arm 230 swings clockwise with shaft 218 to release the shiftable link 264 from engagement with arm 190. This allows the coil spring 198 to bias the rear bow upwardly to its position shown in Figure 2. The movement of the rear bow takes place while the rear portion of the lid is initially being shifted upwardly before the entire lid is shifted rearwardly, so that there will be no interference between the lid and the rear bow. A sealing strip 270 fits within a channel extending around the rear portion of the body to seal the opening between the lid and the body when the lid is in closed position as shown in Figure 10.

Referring now to Figure 12, the electrical aspects of the operation of the top will be described. To operate the convertible top from a stored position to a fully raised position, it is necessary only to move the dash-mounted main control switch 1012 to the "up" position. As the switch 1012 closes, current from the battery 1010 passes through conductor 1016, switch 1012 and conductor 1018 to terminal 1020 and thence through conductor 1022, normally closed switch S–9, conductor 1024, and coil 1026 of solenoid switch R–4 to ground 1028. Current then flows from terminal 1020 through conductor 1036, terminal 1032, contact element 1034, terminal 1030, and conductor 1131 to terminal 1112. From terminal 1112 the current passes through conductor 1038 to the deck lid motor 1008, and thence through conductor 1040 and terminal 1041 to ground 1042. Thus, the deck lid motor is energized to raise the lid 8 from its closed position.

As the lid opens, normally open switch S–7 is closed. When switch S–7 closes, current flows from terminal 1020 through conductors 1044 and 1046 to limit switch S–11. From switch S–11, which is normally closed, current flows through conductor 1048 to energize solenoid switch R–5 by passing through coil 1050 and conductor 1052 to ground 1054. Current then flows from terminal 1020 through conductor 1062, terminal 1056, contact member 1060, terminal 1058, conductor 1064, and terminal 1066 and to the top drive motors 1000 and 1002 through conductors 1068 and 1070, respectively. The current passes from the motors 1000 and 1002 to a common ground conductor 1001 through conductors 1003 and 1005, respectively.

Thus far the deck lid has moved upwardly and rearwardly out of its closed position and the dual motor drive for the top has begun to raise the folded top from its stored position in the body. The top continues to rise until it reaches its fully open position at which time limit switch S–11 opens, de-energizing solenoid switch R–5, thereby de-energizing the top drive motors 1000 and 1002. Switch S–9 also opens at this time, thereby breaking the circuit previously established between terminal 1020 and ground 1028 by conductor 1022, conductor 1024, and coil 1026 so that the deck lid motor 1008 is de-energized at switch R–4. At the same time, switch S–10 closes thereby establishing a circuit from terminal 1020 through conductor 1072, switch S–10, and conductor 1074 to solenoid switch R–1 where it passes through coil 1076 to ground 1078.

Current now passes from terminal 1020 through conductor 1036, terminal 1032, contact member 1084, terminal 1080, and conductor 1081 to terminal 1158 and thence through conductor 1088 to the deck lid motor 1008 and through conductor 1040 and terminal 1041 to ground 1042. This causes the lid motor 1008 to operate in the reverse direction, thereby moving the lid to its closed position after the convertible top has reached its fully raised position. As the deck lid moves to its fully closed position, switch S–7 again opens. Switch 1012 is then moved manually to neutral, de-energizing relay R–1 and the lid motor.

When it is desired to lower the convertible top, switch 1012 is moved to the "down" position. Current then flows from battery 1010 through conductor 1016, switch 1012, and conductor 1090 to terminal 1092. From terminal 1092 current flows through conductor 1094, normally closed switch S–14, and conductor 1096 to solenoid switch R–2 where it energizes coil 1098 and passes to a ground 1100. Current then flows from terminal 1092 through conductor 1108, terminal 1104, contact member 1106, terminal 1102, conductor 1110, terminal 1112, and conductor 1038 to the deck lid motor 1008, and thence through conductor 1040 and terminal 1041 to ground 1042, thereby energizing the deck lid motor 1008 and causing the deck lid to begin its movement out of its closed position.

As the deck lid moves out of its closed position, switch S–8, normally open, is closed by the movement of the deck lid and current flows from terminal 1092 through conductor 1114, switch S–8, conductor 1116, normally closed switch S–12, and conductor 1118 to solenoid switch R–3 where it passes through coil 1120 to ground 1122. Thus energized, switch R–3 establishes a circuit from terminal 1092 through conductor 1124, terminal 1126, contact member 1128, terminal 1130, conductor 1132, terminal 1134, and conductors 1136 and 1138 to the top motors 1002 and 1000, respectively. Thus far it will be understood that the deck lid has now been moved upwardly and rearwardly to open the folding top storage chamber while the top drive motors 1000 and 1002 have been actuated in a reverse direction to begin lowering and folding the convertible top. The top continues to retract and fold, actuated by the cable system previously described, until it has folded completely and is lowered into its storage chamber.

When the folded top is in the proper storage position the power unit 1006 opens limit switch S–12, de-energizing R–3 and the top lowering circuit. It also opens limit switch S–14, de-energizing R–14 and thereby the lid opening circuit to motor 1008. Normally open switch S–13 is closed at this time thereby establishing a circuit from terminal 1092 through conductor 1140, switch S–13, and conductor 1143 to solenoid switch R–6 where it passes through coil 1144 to ground 1146. Thus energized, switch R–6 establishes a current flow from terminal 1092 through conductor 1148, terminal 1050, contact member 1152, terminal 1154, conductor 1156, terminal 1158, and conductor 1088 to the deck lid motor 1008 and thence through conductor 1040 and terminal 1041 to ground 1042, thereby actuating the deck lid motor in the reverse direction to move the deck lid into its closed position after the convertible top has been moved by its cables into its storage position. During this movement S–8 is opened. When the lid is closed, switch 1012 is moved manually to neutral to de-energize R–6 and the lid motor 1008. The cycle is now completed with the top completely retracted and the lid moved into its closed position to present a smooth unbroken automobile contour.

From the foregoing description it will now be understood that the various movements of the top structure are initiated primarily by two sets of contact switches; the first set comprising S–9, S–10 and S–11 used in raising the top, and a second set comprising S–12, S–13 and S–14 which are used in lowering the top; together with switches S–7 and S–8 which are actuated by the movements of the deck lid. Power unit 1006, in addition to moving cable 150, Figure 4, serves to contact switches S–9, S–10 and S–11, when the top is raised, and switches S–12, S–13 and S–14 when the top is down. By reference to the circuit diagram of Figure 12 it will be seen that when the top is being raised or lowered, i.e. so that the power unit 1006 does not contact either set of switches, current flows only to one set of switches from terminal 1020 or terminal 1092, whichever one is energized by switch 1012.

In summary, the present invention provides an improved convertible top structure which not only requires a minimum of body space for its storage but also utilizes a fully automatic control system which moves a protective and decorative rear deck lid section into and out of position and raises and lowers the top smoothly and easily. The invention provides a strong, well braced automobile top construction adapted to meet the needs of modern automobile design where space is at a minimum and automatic operation is desired.

While a specific embodiment of this invention has been shown and described, various changes and modifications may be made within the scope and spirit of the invention.

We claim:

1. In a convertible vehicle, the combination comprising a top frame including a pair of spaced foldable side rails joined by a number of transverse bows, each of said side rails including a front rail section and a rear rail section, linkage means interconnecting said side rail sections to permit folding movement thereof, a storage compartment within said vehicle receiving said top frame in the folded position thereof, track means within said compartment, top frame support members movable along said track means, power driven means interconnecting said top frame support members and said side rails for folding and unfolding said top frame, power drive means for moving said top frame support members along said track means to bodily move said top frame into and out of said compartment, and means for transferring power from said power drive means to said power driven means to fold and unfold said top frame, said means including a cam supported within said storage compartment and a cam follower supported by one of said top frame support members and engageable with said cam as said one top frame support member moves along said track means.

2. In a convertible vehicle, the combination comprising a top frame including a pair of spaced foldable side rails joined by a number of transverse bows, each of said side rails including a front rail section and a rear rail section, linkage means interconnecting said side rail sections to permit folding movement thereof, a storage compartment within said vehicle receiving said top frame in the folded position thereof, track means within said compartment, top frame support members movable along said track means, power driven means interconnecting said top frame support members and said side rails for folding and unfolding said top frame, power drive means for moving said top frame support members along said track means to move said top frame into and out of said compartment, and means for transferring power from said power drive means to said power driven means to fold and unfold said top frame, said means including a stationary cam mounted within said storage compartment and a cam follower supported by one of said top frame support members and engageable with said cam as said one top frame support member moves along said track means.

3. In a convertible vehicle, the combination comprising a top frame including a pair of spaced foldable side rails joined by a number of transverse bows, each of said side rails including a front rail section and a rear rail section, linkage means interconnecting said side rail sections to permit folding movement thereof, a storage compartment within said vehicle receiving said top frame in the folded position thereof, track means within said compartment, top frame support members movable along said track means, power driven means for folding and unfolding said top frame, said power driven means including first and second power arms, one of said power arms being interconnected with said linkage means and the other of said power arms being interconnected with one of said rail sections, power drive means for moving said top frame support members along said track means to move said top frame into and out of said compartment, and means for transferring power from said power drive means to said power driven means to fold and unfold said top frame, said means including stationary cam means mounted within said storage compartment and cam follower means supported by one of said top frame support members and engageable with said cam means as said one top frame support member moves along said track means, and means interconnecting said cam follower means with said first and second power arms whereby engagement and disengagement of said cam follower means with said cam means folds and unfolds said top frame.

4. In a convertible vehicle, a combination comprising a top frame including a pair of spaced foldable side rails joined by a number of transverse bows, each of said side rails including a front rail section and a rear rail section, linkage means interconnecting said side rail sections to permit folding movement thereof, a storage compartment within said vehicle receiving said top frame in the folded position thereof, track means within said compartment, a top frame support member movable along said track means, power driven means for folding and unfolding said top frame, said power driven means including a first power arm pivotally interconnected with said linkage means and a second power arm interconnected with one of said rear rail sections, power drive means for moving said top frame support member along said track means to move said top frame into and out of said compartment, and means for transferring power from said power drive means to said power driven means to fold and unfold said top frame, said means including a stationary cam mounted within said storage compartment and an arm connected to said top frame support member and having a cam follower engageable with said cam as said top frame support member moves along said track means, said first and second power arms being interconnected with said arm whereby engagement and disengagement of said cam follower with said cam folds and unfolds said top frame.

5. A power operating mechanism for a foldable vehicle top frame movable into and out of a vehicle storage compartment comprising, in combination, track means mounted within said storage compartment, a top frame support member movable along said track means, first and second power arms interconnected with said foldable top frame for folding and unfolding said frame, one of said power arms being pivoted on said top frame support member, arm means pivoted on said top frame support member and interconnected with said first and second power arms, means engageable by said arm means as said top frame support member moves along said track means for rotating said arm means relative to said top frame support member whereby said one of said power arms is rotated relative to said top frame support member and said other power arm is shifted relative to said top frame support member to fold and unfold said top frame, said means including a cam fixedly supported within said storage compartment and a cam follower supported by said arm means, and power drive means for moving said top frame support member along said track means.

6. In a convertible vehicle, the combination comprising a top frame including a pair of spaced foldable side rails joined by a number of transverse bows, each of said side rails including a front rail section and a rear rail section, parallelogram linkage means interconnecting said side rail sections to permit folding movement thereof, a storage compartment within said vehicle receiving said top frame in the folded position thereof, track means within said compartment, top frame support members movable along said track means, power driven means for folding and unfolding said top frame, said power driven means including first and second power arms, linkage means interconnecting one of said power arms with said parallelogram linkage means and one of said rail sections, the other of said power arms being fixedly supported on said one of said rail sections, power drive means for moving said top frame support members along said track means to move said top frame into and out of said compartment, and means for transferring power from said power drive means to said power driven means to fold and unfold said top frame, said means including stationary cam means mounted within said storage compartment and cam follower means supported by one of said top frame support members and engageable with said cam means as said one top frame support member moves along said track means, and means interconnecting said first and second power arms with said cam follower means whereby engagement and disengagement of said cam follower means with said cam means folds and unfolds said top frame.

7. In a convertible vehicle having a body, the combination comprising, a foldable top frame, a storage compartment within the body of said vehicle into which said top frame may move bodily when in folded position, guide means mounted on the vehicle body within said compartment, support means operatively connected to said frame and movable along said guide means for mounting said top frame on said body for bodily translational movement into and out of said compartment, power driving means operatively connected to said support means for so moving said top frame, control means operatively interconnecting said support means and said top frame for controlling the folding movement thereof, means within said compartment engageable by said control means for restraining bodily translational movement of said control means upon initial bodily movement of said top frame into said compartment to thereby fold said frame, said control means being disengageable from said last-mentioned means when said top frame is folded for bodily movement with said support means into said compartment.

8. Apparatus of the character claimed in claim 7, wherein said control means includes a power arm member operatively connected to said top frame for controlling the folding movement thereof during engagement of said control means with said restraining means.

References Cited in the file of this patent

UNITED STATES PATENTS

| | | |
|---|---|---|
| 882,914 | Scheper | Mar. 24, 1908 |
| 1,826,399 | Humes | Oct. 6, 1931 |
| 2,350,634 | Parsons | June 6, 1944 |
| 2,362,939 | Simpson | Nov. 14, 1944 |
| 2,578,990 | Bessonneau | Dec. 18, 1951 |
| 2,580,486 | Vigmostad | Jan. 1, 1952 |
| 2,593,360 | Sulkowski | Apr. 15, 1952 |
| 2,613,987 | Stanfield | Oct. 14, 1952 |
| 2,617,681 | Hawver | Nov. 11, 1952 |
| 2,729,502 | Hale | Jan. 3, 1956 |
| 2,768,857 | Albrecht | Oct. 30, 1956 |

FOREIGN PATENTS

| | | |
|---|---|---|
| 13,744 | Great Britain | Sept. 27, 1915 |